W. A. TURBAYNE.
SYSTEM OF ELECTRICAL DISTRIBUTION.
APPLICATION FILED JAN. 25, 1917. RENEWED MAR. 5, 1921.

1,374,042.

Patented Apr. 5, 1921.
2 SHEETS—SHEET 1.

WITNESS:
Fay E Bronk.
Ralph Munden

INVENTOR.
William A. Turbayne.
BY
Raymond H Van Kest.
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,374,042. Specification of Letters Patent. Patented Apr. 5, 1921.

Application filed January 25, 1917, Serial No. 144,464. Renewed March 5, 1921. Serial No. 449,602.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the present invention relates to systems involving variable speed generators which are subject to reversals of rotation and storage batteries to be charged thereby.

One of the objects of the present invention is to provide a system of the kind referred to in which the polarity of the generator will be automatically maintained constant, regardless of reversals in the direction of rotation and in which the output of the generator will be automatically reduced upon the attainment of predetermined conditions.

A further object is to provide a system which will accomplish the above mentioned object and will also accomplish the regulation of the generator.

Further objects will be apparent from the description which follows:

Referring to the drawings:—

Figure 1:
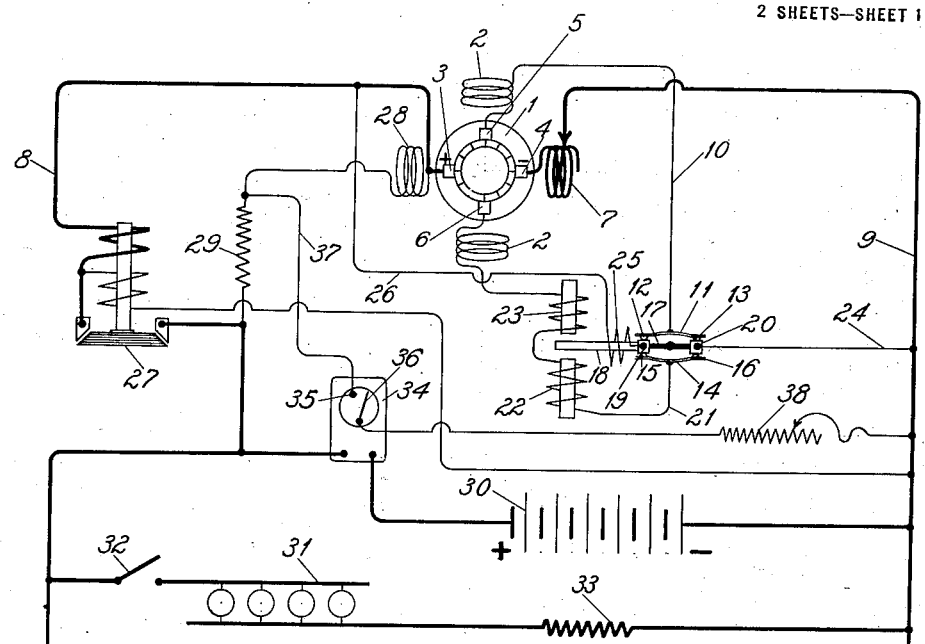
Figure 1 represents one embodiment of the present invention.

In the system illustrated in Fig. 1, the main generator 1 has shunt field windings 2, 2, main brushes 3, 4, and auxiliary brushes 5 and 6. Said auxiliary brushes 5 and 6 are spaced 90 electrical degrees from the main brushes. From the main brushes, conductors lead off through the coil 7, hereinafter described, to the main circuit, indicated at 8 and 9. The auxiliary brushes 5 and 6 connect the field coils 2, 2, through the armature.

The field coils 2, 2, are so connected with the main conductors 8 and 9, that current from said conductors may be directed through said coils in either direction, depending upon the operation of a pole changing device hereinafter described. A conductor 10 leads from one of the field coils 2 and is connected to a conducting member 11, having opposite contacts 12 and 13. A corresponding member 14 is provided with contacts 15 and 16. Between the four contacts referred to there is pivoted an insulating member 17 having an extension 18 of magnetic material, said insulating member carrying contact members 19 and 20, which contact members are adapted to coöperate with the four contact members described in a manner more fully pointed out hereinafter. From the lower conducting member 14 there extends the conductor 21, connected with the coils 22 and 23, which are connected in turn with the other field coil 2. A movable contact 20 is connected with the conductor 9 by an intermediate conductor 24 and the opposite contact 19 is connected with the coil 25 surrounding the magnetic extension 18, which coil connects through conductor 26 with the other main conductor 8.

An automatic switch 27 will be provided in one of the mains. It is illustrated as being located in the main 8 and may be of any preferred construction. Connected across the gaps of the automatic switch 27 is a circuit including the field coil 28 and the resistance 29. This coil 28 is displaced from the main field coils 2, 2, 90 electrical degrees.

A storage battery 30 will be connected across mains 8 and 9. Also connected across said mains is the lighting circuit 31 which may be provided with any suitable switch 32, and with any preferred form of rheostat 33, for maintaining constant voltage upon the lights.

Connected in the battery branch is an ampere hour meter 34. This meter may be of any preferred construction, but should be of the type which automatically changes its rate of registration upon the reversal of current flow therethrough. Such a type of ampere hour meter is well known, and may be calibrated to compensate for the losses of the storage battery, whereby said ampere hour meter will, at all times, indicate the available charge in the storage battery. The ampere hour meter 34 will be provided with a fixed contact 35 and a movable contact 36. The fixed contact will be connected through a conductor 37 to one end of the field coil 28. The movable contact 36 of the ampere hour meter will be connected through an adjustable resistance 38 to the main 9.

The diagram disclosed in Fig. 1 illustrates conditions when the car is at rest, whereupon it will be apparent that the lamp load may be carried by the storage battery, if desired, by merely closing switch 32. The field coil 28 is connected to the storage battery 30 through a circuit which includes the ampere hour meter 34, the resistance 29, field coil 28, the armature of the generator 1, coil 7 and conductor 9. Inasmuch as the car is at rest and the rotor of the generator 1 is not in motion, no E. M. F. will be developed by the armature of the generator. Under these circumstances, when the generator armature commences to rotate slowly, as when the train starts, a small current will be caused to circulate through the field coils 2, 2, and through the circuit including conductors 10 and 11, contacts 19 and 20, conductor 14, and coils 22 and 23. This current is generated owing to the fact that coil 28 is displaced 90 electrical degrees from the auxiliary brushes 5, 6, and therefore sets up a magnetic flux of fixed polarity which will develop an E. M. F. across said auxiliary brushes 5 and 6 in a direction depending upon the direction of rotation, but which will produce no E. M. F. across the main brushes 3 and 4. This exciting current through field coils 2, 2, will in turn develop an E. M. F. across main brushes 3 and 4, so that the current will circulate through conductor 26, coil 25, through the pole changing device to conductor 24, main 9, back to brush 4 of the generator, thus polarizing the magnetic extension 18. The result will be that, at a low rate of rotation, the energization of the coil 25 will be sufficient to operate the pivoted member 17 in one direction or the other, depending upon the polarity of the operating coils 22 and 23, whereupon the pressure of the movable contacts 19 and 20 on the proper adjacent fixed contacts, and the electrical contact established thereby, is such that the pole changing device as a whole directs the current from the mains 8 and 9 through the shunt coils 2, 2, in such a direction that the E. M. F. developed by the main brushes is added to that developed by the auxiliary brushes, so that both become effective in building up very quickly the voltage of the generator as a whole. It will be apparent that as the coil 28 is always excited in the same direction, reversal or rotation of the armature will change the polarity of the brushes 5 and 6, so that the coils 22 and 23 will also reverse and coöperate with the coil 25, which is of fixed polarity, to always maintain the proper field circuit connections for the altered direction of rotation. After the actuation of the pole changing device, the generator will be excited by the shunt field windings 2, 2, being assisted somewhat by the voltage developed across the auxiliary brushes, so that upon increased speed of rotation, the increased voltage eventually is sufficient to cause the closing of the automatic switch 27 which connects the generator with the battery and lamp circuit. As soon as the automatic switch closes, the coil 28, with its resistance 29, is short-circuited, so that the machine no longer derives any excitation from said field coil 28, assuming that the contacts of the ampere hour meter 34 are open. When, however, current is delivered through the main brushes 3 and 4 of the external circuit, this current circulating in the armature winding will develop a magnetic flux in line with these brushes and at right angles to the main flux developed by the field windings 2, 2, the resultant flux being thereby distorted in the direction of rotation. The flux component, however, effective upon brushes 5 and 6, will now develop an E. M. F. across these brushes, acting in a direction opposite to that formerly resulting by the action of the coil 28, so that a counter E. M. F. will be included in the main field circuit, acting to weaken the effective excitation upon increase of working armature current, so that, regardless of the speed of rotation of the generator 1, this working current would not exceed a certain value.

The winding 7, in series with the external circuit, has the same axis of magnetization as the working armature current, but has an opposing effect thereon. By altering the value of this winding, as by changes in the number of turns in a well known manner, the desired generator output may be altered at will.

The generator 1 will continue to deliver current to the storage battery 30 through the ampere hour meter 34 until the movable contact 36 of said ampere hour meter comes into contact with the stationary contact 35. The ampere hour meter will be so calibrated that said contacts 35 and 36 will be closed when a sufficient number of ampere hours have been delivered to the battery to bring the same to a state of full charge. When the battery has received the amount of ampere hours charge necessary to cause the closing of said contacts 35 and 36, a circuit will be completed across the main generator leading from the brush 3, through coil 28, conductor 37, ampere hour meter contacts 35 and 36, adjustable resistance 38, main 9, coil 7 and brush 4. It will be noted that the coil 28 will now be connected across the terminals of the generator in such a manner that current flows therethrough in a reverse direction to that described above in connection with the starting of the generator. Current will now pass from the brush 3 through the coil 28, ampere hour meter contacts 35 and 36, returning to the generator through brush 4. This current now flowing through coil 28 in a reverse direction, develops an increased counter E. M. F. across the auxiliary brushes 5 and 6. This increase in the counter E. M. F. across the brushes 5 and 6 causes a reduction in the field excitation and therefore a reduction in the current delivered by the generator. By manipulation of the adjustable resistance 38, the coil 28 may be given such a magnetizing value that this coil assumes the regulation by itself, developing the required counter E. M. F. across the regulating brushes 5 and 6. The resistance 38 may be so adjusted that the current delivered to the battery may be reduced substantially to a zero value, so that the battery will merely float across the mains.

Figure 2:
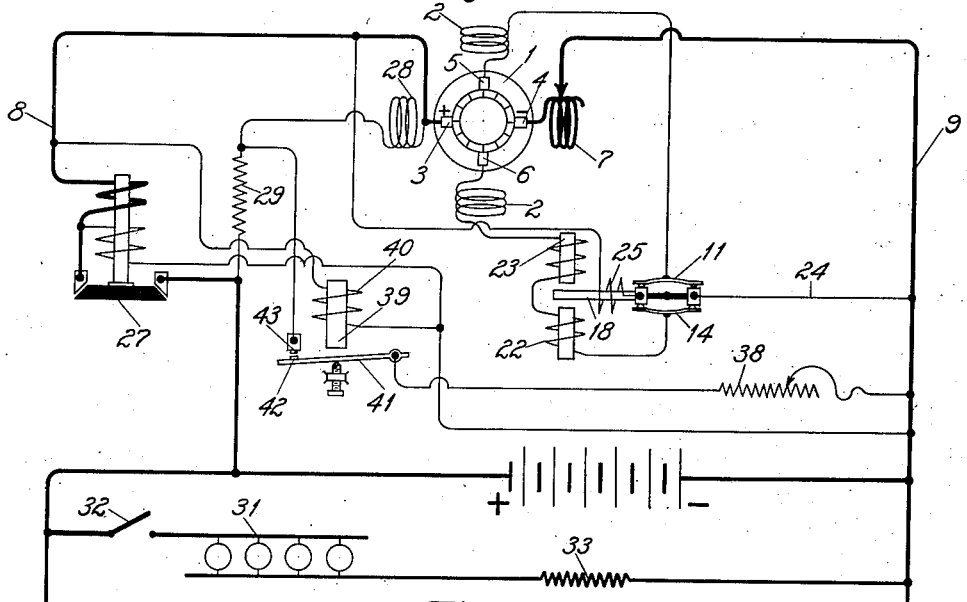
Figs. 2 and 3 represent modified systems.

Fig. 2 represents a system similar in a number of respects to the system illustrated in Fig. 1. In Fig. 2 the connections of the field coil 28 are controlled by a relay responsive to voltage across the mains 8 and 9. In Fig. 2, instead of an ampere hour meter, a relay 39 is employed. This relay is provided with an operating coil 40 which is connected across the mains 8 and 9. The relay is provided with a armature 41 which carries a movable contact 42 adapted to coöperate with a stationary contact 43. The movable contact 42 is connected to the main 9 through the adjustable resistance 38, whereas the stationary contact 43 is connected to one end of the field coil 28.

In the operation of the system disclosed in Fig. 2, when a certain predetermined voltage is reached across the mains 8 and 9, such, for instance, as might exist with a fully charged battery, the relay 39 will operate to close contact 42 upon contact 43. The field coil 28 will now be connected across the main brushes of the generator 1 and will operate in a manner similar to that described above in connection with Fig. 1, to reduce the output of the generator to the desired value.

Figure 3:
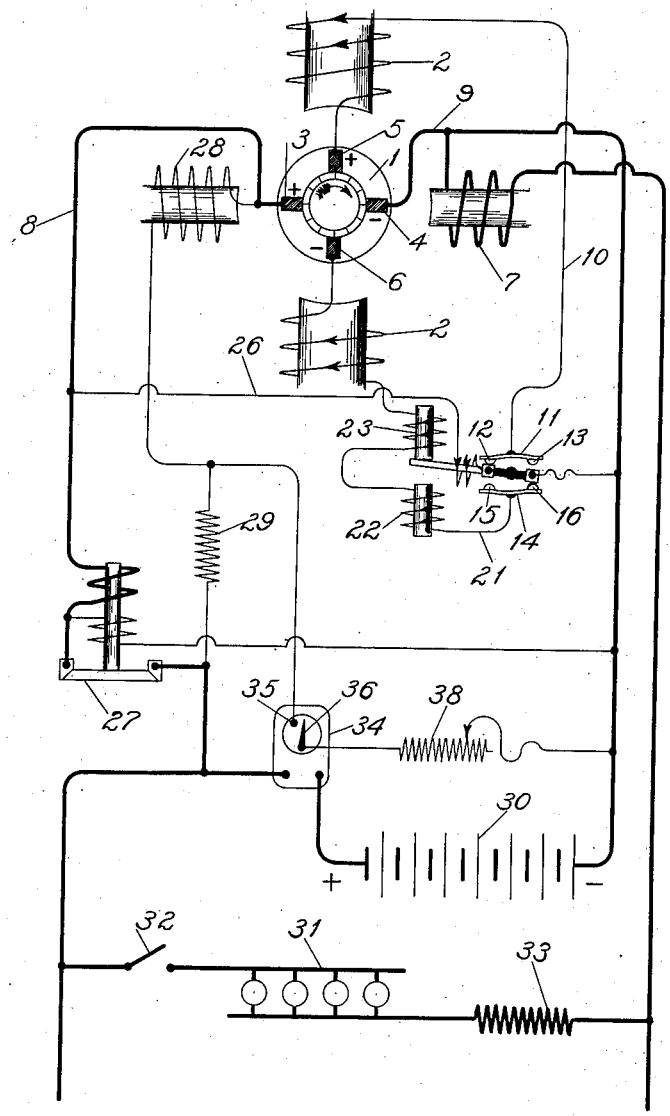

The system disclosed in Fig. 3 illustrates a modification involving an arrangement of the coil 7 which is different from that disclosed in Figs. 1 and 2. Fig. 3 represents conditions when the generator is in operation and the automatic switch is closed. The pole changing device is indicated as being displaced from its mid position, whereby the main field coils 2, 2, are connected across brushes 5 and 6 to supply the excitation for the generator. The respect in which the arrangement of the coil 7 differs from the arrangement in Figs. 1 and 2, will be at once apparent. Instead of being arranged in the main 9, Fig. 3 shows said coil 7 as being arranged in the lamp branch only. The effect of this arrangement will be that the system disclosed in Fig. 3 will operate to increase the current output of the generator in response to increases in lamp demand. The coil 7 is wound in such a direction that when current is supplied to the lamp circuit, the magnetizing effect imparted thereby acts to reduce the E. M. F. existing across the auxiliary brushes 5 and 6, thereby causing an increase in the main field flux. The generator is thus enabled to carry the increased load caused by turning on lamps without bringing about a reduction in the current entering the battery.

Each of the drawings shows a bipolar machine with the main and auxiliary brushes actually displaced 90 degrees angularly, but in practice the machine may be provided with any practical number of poles as long as the auxiliary brushes maintain the 90 electrical degree space relation as described. Instead of the ampere hour meter or the voltage controlled relay illustrated, the connections of the coil 28 may be controlled by any preferred means which will act in response to the desired predetermined conditions. It will be further apparent that the invention is not limited to the particular arrangement of instrumentalities selected for the purpose of illustration, as various changes and rearrangements of parts may be effected without departing from the spirit of the invention as defined in the appended claims.

What I claim as new and desire to secure by Letters Patent of the United States, is:—

1. In a car-lighting system, in combination, a storage battery, a variable speed generator, said generator having magnetic means coöperating with said battery for insuring constant polarity of said generator, and means responsive to predetermined conditions for causing said magnetic means to cut down the output of said generator.

2. In combination, a generator provided with main field windings and an auxiliary field winding for controlling the excitation of said main field winding to insure constant polarity of said generator regardless of reversals of rotation, and means responsive to predetermined conditions for rendering said auxiliary field winding effective to cut down the output of said generator.

3. In combination, a storage battery, a variable speed generator having main field windings and an auxiliary winding, said auxiliary winding being connected to said storage battery for controllng the polarity of said field windings under certain conditions and means for causing said auxiliary winding to set up a counter E. M. F. across said field windings under certain other conditions.

4. In combination, a generator provided with main field coils and an auxiliary field coil, a storage battery and an automatic switch, means for connecting said auxiliary coil across said automatic switch, and means for connecting said auxiliary coil across the terminals of said generator.

5. In combination, a generator provided with main brushes, field brushes located 90 electrical degrees from said main brushes, field windings connected across said field brushes, and means for setting up an E. M. F. across said field brushes, and a relay for causing said means, under certain conditions, to set up a counter E. M. F. across said field brushes.

6. In combination, a variable speed generator, said generator being provided with main field windings, a winding for insuring constant polarity of said generator regardless of reversals of rotation, and means for connecting said last mentioned winding to cause a reversal of current flow therethrough, whereby to set up an E. M. F. opposed to that of said main windings.

7. A generator having field coils and an exciting coil displaced from the axes of said field coils, a source of current, connections whereby said exciting coil may be connected through the armature of the generator across said source, and means responsive to predetermined conditions for automatically connecting said exciting coil in circuit to direct current reversely therethrough.

8. A generator having an armature, a plurality of main brushes, a plurality of field coils and a plurality of auxiliary brushes, said auxiliary brushes serving to connect two of said field coils through the armature, a source of current, and connections for connecting another of said field coils either in series between said source and said armature or across said armature.

9. In combination, a variable speed generator provided with field windings, a storage battery, a controlling winding for setting up an E. M. F. across said field windings to insure a constant polarity of said generator, and means responsive to predetermined conditions to cause said controlling winding to set up a counter E. M. F. across said field windings.

10. In combination, a variable speed reversible generator provided with field windings, a storage battery, means for setting up an E. M. F. across said field windings to insure a constant polarity of said generator, and means responsive to the net input to said storage battery for causing said first mentioned means to set up a counter E. M. F. across said field windings.

In witness whereof, I have hereunto subscribed my name.

WILLIAM A. TURBAYNE.